United States Patent
Rodriguez

(10) Patent No.: US 10,837,629 B1
(45) Date of Patent: Nov. 17, 2020

(54) TRIMMER TOOL SHAFT LIGHT ATTACHMENT APPARATUS

(71) Applicant: Vincent Rodriguez, Flatonia, TX (US)

(72) Inventor: Vincent Rodriguez, Flatonia, TX (US)

( * ) Notice: Subject to any disclaimer, the term of this patent is extended or adjusted under 35 U.S.C. 154(b) by 0 days.

(21) Appl. No.: 16/801,833

(22) Filed: Feb. 26, 2020

(51) Int. Cl.
| | |
|---|---|
| *F21V 21/088* | (2006.01) |
| *A01D 34/00* | (2006.01) |
| *A01D 75/00* | (2006.01) |
| *F21V 33/00* | (2006.01) |
| *F21Y 115/10* | (2016.01) |
| *A01D 34/416* | (2006.01) |

(52) U.S. Cl.
CPC ........ *F21V 21/0885* (2013.01); *A01D 34/001* (2013.01); *A01D 75/00* (2013.01); *F21V 33/006* (2013.01); *A01D 34/416* (2013.01); *F21Y 2115/10* (2016.08)

(58) Field of Classification Search
CPC . F21V 21/0885; F21V 33/006; F21Y 2115/10
See application file for complete search history.

(56) References Cited

U.S. PATENT DOCUMENTS

| | | | |
|---|---|---|---|
| 6,939,022 B2 | 9/2005 | Brooks | |
| 7,300,172 B1 * | 11/2007 | Lefler | A47L 9/2836 362/191 |
| D663,594 S | 7/2012 | Yamamoto | |
| 8,240,893 B2 * | 8/2012 | Lin | F21V 21/30 362/396 |
| 8,550,516 B2 | 10/2013 | Best | |
| 8,677,632 B2 | 3/2014 | Yamaoka | |
| 10,107,484 B2 | 10/2018 | Moyers | |
| 2002/0108579 A1 | 8/2002 | Borries | |
| 2006/0072308 A1 * | 4/2006 | Booty, Jr. | F21V 15/01 362/190 |
| 2006/0221598 A1 | 10/2006 | March | |
| 2010/0064866 A1 | 3/2010 | Freeman | |
| 2016/0131345 A1 * | 5/2016 | Ammer | F21L 4/027 362/183 |
| 2017/0314769 A1 * | 11/2017 | Cacciabeve | B60Q 3/35 |

* cited by examiner

*Primary Examiner* — Evan P Dzierzynski

(57) ABSTRACT

A trimmer tool shaft light attachment apparatus for adding a light source to trimmer tools includes a clamp body having a clamp outer side, a clamp inner side, a clamp front edge, and a clamp back edge. The clamp body has a left arm portion, a medial portion, and a right arm portion to selectively engage a shaft of a trimmer tool. A light housing is coupled to the clamp inner side and has a housing front side and a housing inner side defining a housing cavity with the clamp inner side. An LED is coupled within the housing cavity and extends through the housing front side. A battery is coupled within the housing cavity and is in operational communication with the LED. A power button is coupled to the clamp body. The power button is in operational communication with the LED and the battery.

9 Claims, 4 Drawing Sheets

TRIMMER TOOL SHAFT LIGHT ATTACHMENT APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to trimmer tool attachment devices and more particularly pertains to a new trimmer tool attachment device for adding a light source to trimmer tools.

(2) Description of Related Art Including Information Disclosed Under 37 CFR 1.97 and 1.98

The prior art relates to trimmer tool attachment devices and trimmer tools with integrated lights. Existing devices with integrated lights require the purchase of an entirely new trimmer tool and are thus not desirable to most who already own an unilluminated version of the same trimmer tool. Existing attachment devices may employ more complex clamping systems or are generally bulky.

BRIEF SUMMARY OF THE INVENTION

An embodiment of the disclosure meets the needs presented above by generally comprising a clamp body having a clamp outer side, a clamp inner side, a clamp front edge, and a clamp back edge. The clamp body has a left arm portion, a medial portion, and a right arm portion configured to selectively engage a shaft of a trimmer tool. A light housing is coupled to the clamp inner side and has a housing front side and a housing inner side defining a housing cavity with the clamp inner side. An LED is coupled to the light housing within the housing cavity and extends through the housing front side. A battery is coupled to the light housing within the housing cavity and is in operational communication with the LED. A power button is coupled to the clamp body. The power button is in operational communication with the LED and the battery.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
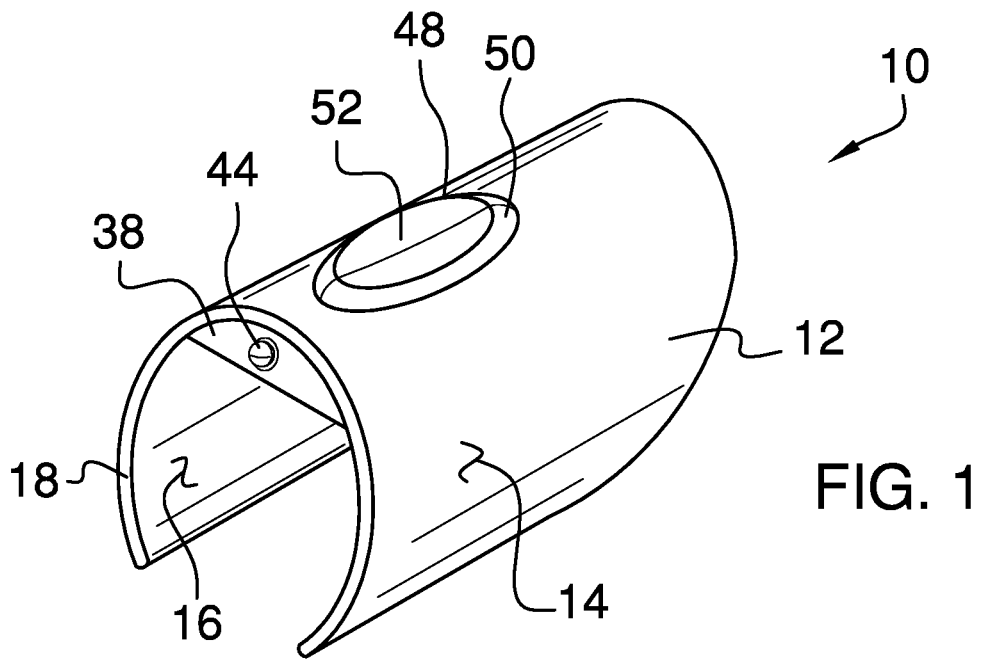
FIG. 1 is an isometric view of a trimmer tool shaft light attachment apparatus according to an embodiment of the disclosure.
Figure 2:
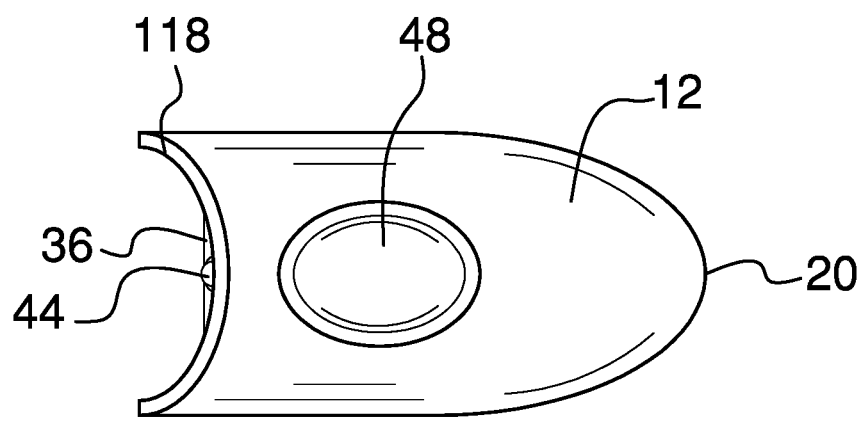
FIG. 2 is a top plan view of an embodiment of the disclosure.
Figure 3:
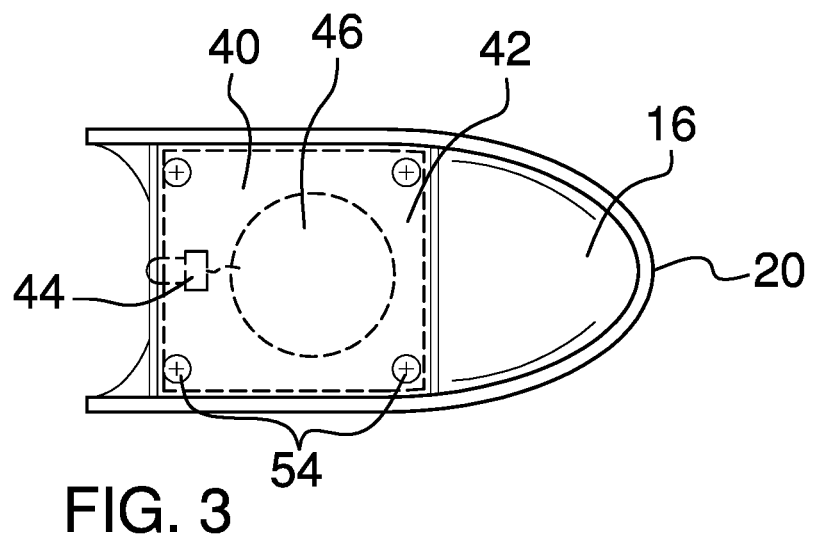
FIG. 3 is a bottom plan view of an embodiment of the disclosure.
Figure 4:
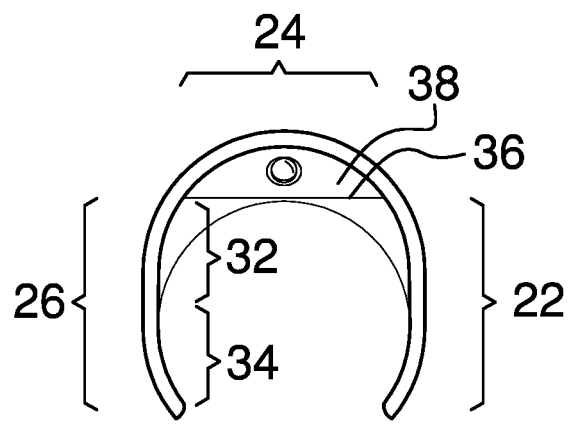
FIG. 4 is a front elevation view of an embodiment of the disclosure.
Figure 5:
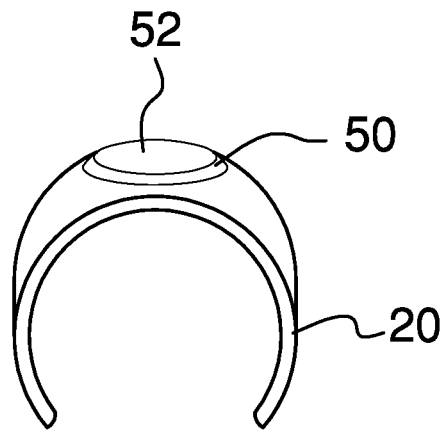
FIG. 5 is a rear elevation view of an embodiment of the disclosure.
Figure 6:
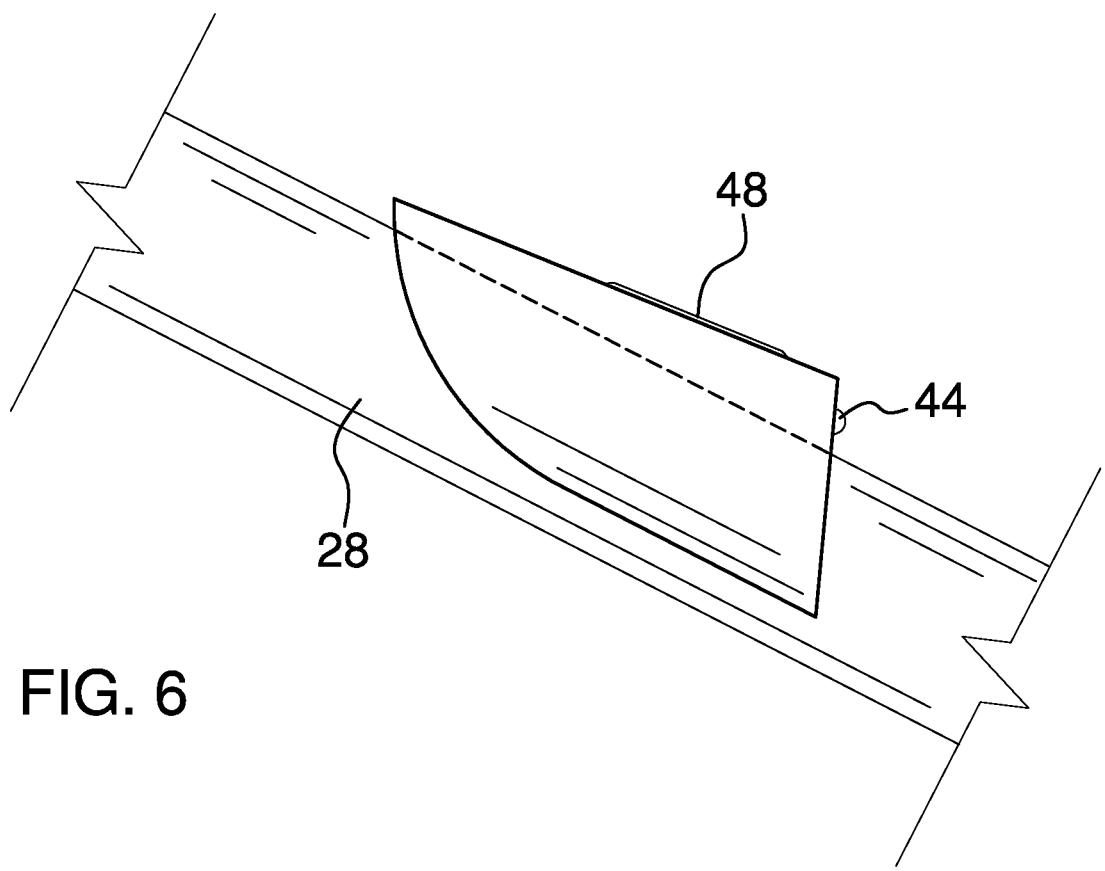
FIG. 6 is a side elevation in-use view of an embodiment of the disclosure.
Figure 7:
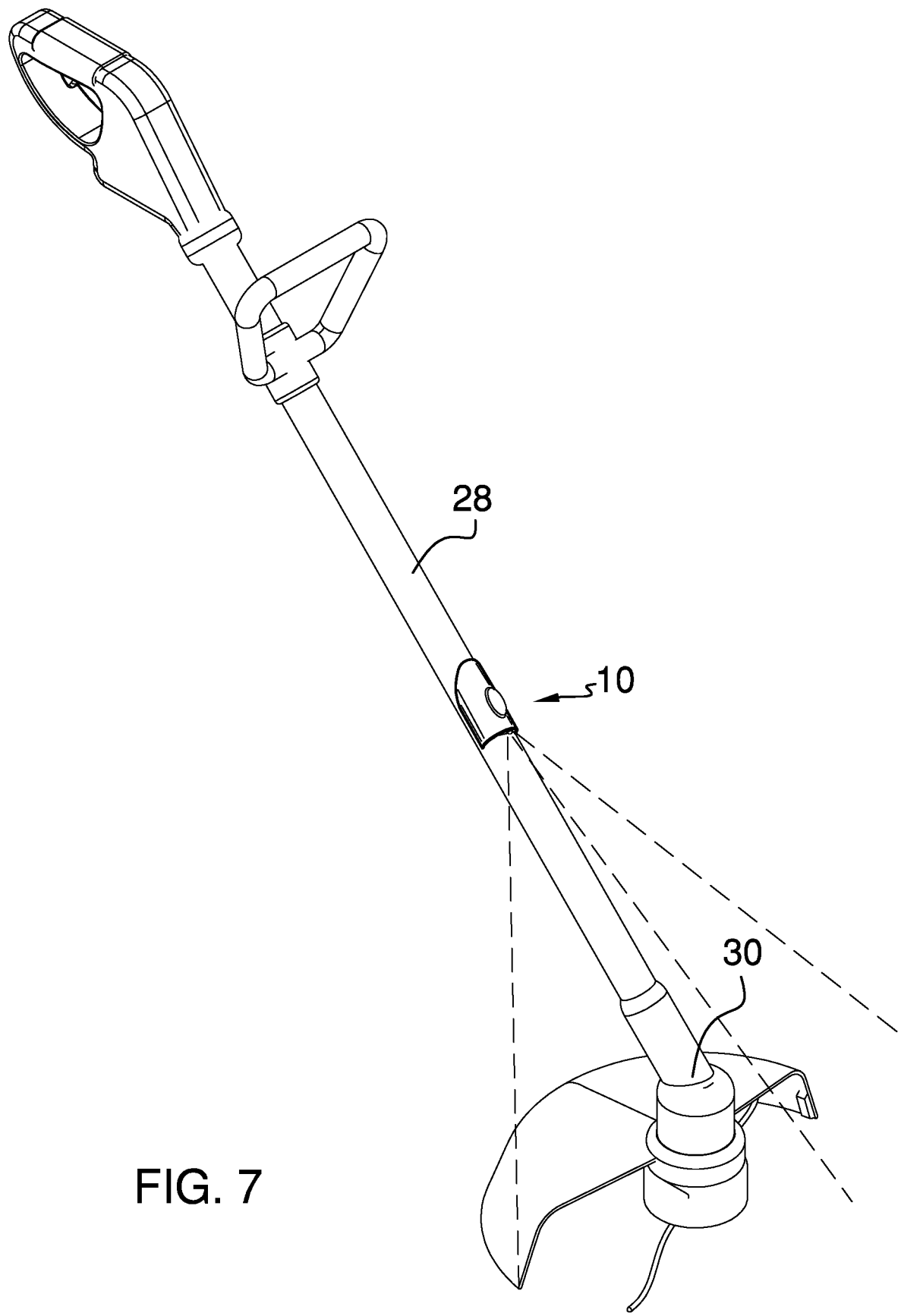
FIG. 7 is an in-use view of an embodiment of the disclosure.

With reference now to the drawings, and in particular to FIGS. 1 through 7 thereof, a new trimmer tool attachment device embodying the principles and concepts of an embodiment of the disclosure and generally designated by the reference numeral 10 will be described.

As best illustrated in FIGS. 1 through 7, the trimmer tool shaft light attachment apparatus 10 generally comprises a clamp body 12 having a clamp outer side 14, a clamp inner side 16, a clamp front edge 18, and a clamp back edge 20. The clamp body 12 has a left arm portion 22, a medial portion 24, and a right arm portion 26 configured to selectively engage a shaft 28 of a trimmer tool 30. The clamp front edge 18 of the left arm portion 22 and the right arm portion 26 may have a straight portion 32 and a rounded portion 34. The left arm portion 22 and the right arm portion 26 are elastically deformable to allow the clamp body 12 to expand to receive the shaft 28 and then secure the shaft 28 without undesired rotation around the shaft 28. The clamp inner side 16 may have a pad or grip to prevent damage to the shaft 28 and to assist in preventing rotation.

A light housing 36 is coupled to the clamp body 12. The light housing 36 is coupled to the clamp inner side 16 and has a housing front side 38 and a housing inner side 40 defining a housing cavity 42 with the clamp inner side 16. The housing inner side 40 is rounded and configured to conform to the curvature of the shaft 28 of the trimmer tool.

The rounded portion 34 of each of the left arm portion 22 and the right arm portion 26 of the clamp body may conform to the curvature of the housing inner side 40. The clamp back edge 20 may be a circular arc also conforming to the curvature of the housing inner side 40. The left arm portion 22 and the right arm portion 22 of the clamp body and the housing inner side 40 may thus form a slotted cylindrical shape to receive the shaft 28 of the trimmer tool. The housing cavity 42 tapers thinner from the clamp front edge 18 to the clamp back edge 20. The housing front side 38 may be angled and configured to form an obtuse angle with the shaft 28 of the trimmer tool to direct light away from the shaft 28 and to illuminate the area being worked on by the trimmer tool 30.

An LED 44 is coupled to the light housing 36 within the housing cavity 42 and extends through the housing front side 38. A battery 46 is coupled to the light housing 36 within the housing cavity 42 and is in operational communication with the LED 44. A power button 48 is coupled to the clamp body 12. The power button 48 may be ovular and may have a raised perimeter portion 50 and a central depressible portion 52. The raised perimeter portion 50 prevents accidental depression of the central depressible portion 52 and helps the user easily locate the power button 48 without looking. The central depressible portion 52 may extend through the medial portion 24 of the clamp body into the housing cavity 42 and is in operational communication with the LED 44 and the battery 46. A plurality of screws 54 may be selectively removed from the housing inner side 40 to disengage the light housing 36 from the clamp body 12 to replace the battery 46.

In use, the clamp body 12 is attached to the shaft 28 of the trimmer tool. The power button 48 is activated as needed to illuminate the LED 44.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A trimmer tool shaft light attachment apparatus comprising:
   a clamp body having a clamp outer side, a clamp inner side, a clamp front edge, and a clamp back edge, the clamp body having a left arm portion, a medial portion, and a right arm portion configured to selectively engage a shaft of a trimmer tool;
   a light housing coupled to the clamp body, the light housing being coupled to the clamp inner side and having a housing front side and a housing inner side defining a housing cavity with the clamp inner side;
   an LED coupled to the light housing, the LED being coupled within the housing cavity and extending through the housing front side;
   a battery coupled to the light housing, the battery being coupled within the housing cavity and being in operational communication with the LED; and
   a power button coupled to the clamp body, the power button being in operational communication with the LED and the battery.

2. The trimmer tool shaft light attachment apparatus of claim 1 further comprising the housing inner side being rounded and configured to conform to the curvature of the shaft of the trimmer tool.

3. The trimmer tool shaft light attachment apparatus of claim 2 further comprising the clamp front edge of the left arm portion and the right arm portion having a straight portion and a rounded portion, the rounded portion conforming to the curvature of the housing inner side.

4. The trimmer tool shaft light attachment apparatus of claim 3 further comprising the clamp back edge being a circular arc conforming to the curvature of the housing inner side, the housing cavity tapering thinner from the clamp front edge to the clamp back edge.

5. The trimmer tool shaft light attachment apparatus of claim 1 further comprising the housing front side lying coplanar with the clamp front edge.

6. The trimmer tool shaft light attachment apparatus of claim 5 further comprising the housing front side being angled and configured to form an obtuse angle with the shaft of the trimmer tool.

7. The trimmer tool shaft light attachment apparatus of claim 2 further comprising the power button extending through the medial portion of the clamp body into the housing cavity.

8. The trimmer tool shaft light attachment apparatus of claim 7 further comprising the power button being ovular and having a raised perimeter portion and a central depressible portion.

9. A trimmer tool shaft light attachment apparatus comprising:
   a clamp body having a clamp outer side, a clamp inner side, a clamp front edge, and a clamp back edge, the clamp body having a left arm portion, a medial portion, and a right arm portion configured to selectively engage a shaft of a trimmer tool, the clamp front edge of the left arm portion and the right arm portion having a straight portion and a rounded portion;
   a light housing coupled to the clamp body, the light housing being coupled to the clamp inner side and having a housing front side and a housing inner side defining a housing cavity with the clamp inner side, the housing inner side being rounded and configured to conform to the curvature of the shaft of the trimmer tool, the rounded portion of each of the left arm portion and the right arm portion of the clamp body conforming to the curvature of the housing inner side, the clamp back edge being a circular arc conforming to the curvature of the housing inner side, the housing cavity tapering thinner from the clamp front edge to the clamp back edge, the housing front side being angled and configured to form an obtuse angle with the shaft of the trimmer tool;
   an LED coupled to the light housing, the LED being coupled within the housing cavity and extending through the housing front side;

a battery coupled to the light housing, the battery being coupled within the housing cavity and being in operational communication with the LED; and a power button coupled to the clamp body, the power button being ovular and having a raised perimeter portion and a central depressible portion, the central depressible portion extending through the medial portion of the clamp body into the housing cavity and being in operational communication with the LED and the battery.

\* \* \* \* \*